United States Patent
Fujimori et al.

(10) Patent No.: US 10,734,932 B2
(45) Date of Patent: Aug. 4, 2020

(54) MOTOR CONTROLLER, CONVEYOR, IMAGE FORMING APPARATUS, AND MOTOR CONTROL METHOD

(71) Applicant: KONICA MINOLTA, INC., Chiyoda-ku, Tokyo (JP)

(72) Inventors: Harumitsu Fujimori, Toyokawa (JP); Yuji Kobayashi, Toyohashi (JP); Kazumichi Yoshida, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/381,076

(22) Filed: Apr. 11, 2019

(65) Prior Publication Data

US 2019/0341866 A1 Nov. 7, 2019

(30) Foreign Application Priority Data

May 1, 2018 (JP) .................................. 2018-087982

(51) Int. Cl.
*H02P 21/26* (2016.01)
*H02P 21/22* (2016.01)
(Continued)

(52) U.S. Cl.
CPC ......... *H02P 21/26* (2016.02); *G03G 15/6558* (2013.01); *H02P 21/18* (2016.02);
(Continued)

(58) Field of Classification Search
CPC ...... H02P 1/00; H02P 1/04; H02P 1/16; H02P 1/163; H02P 1/18; H02P 1/22; H02P 1/24; H02P 1/26; H02P 1/265; H02P 1/28; H02P 1/423; H02P 1/46; H02P 1/465; H02P 1/50; H02P 3/00; H02P 3/12; H02P 3/16; H02P 3/18; H02P 3/26; H02P 6/00; H02P 6/002; H02P 6/005; H02P 6/008; H02P 6/04; H02P 6/08; H02P 6/12; H02P 6/14; H02P 6/24; H02P 6/185; H02P 7/00; H02P 7/06; H02P 7/29; H02P 8/00; H02P 8/08; H02P 8/12;
(Continued)

(56) References Cited

U.S. PATENT DOCUMENTS 4,293,233 A * 10/1981 Hoffman ................ B26D 7/086
101/93.03

FOREIGN PATENT DOCUMENTS

JP  2003224996 A  8/2003
JP  2011182505 A  9/2011
(Continued)

*Primary Examiner* — Antony M Paul
(74) *Attorney, Agent, or Firm* — Buchanan Ingersoll & Rooney PC

(57) ABSTRACT

A motor controller that controls a motor in which a rotor using a permanent magnet is rotated by a rotating magnetic field due to a current flowing through a winding: performs hold control that continuously causes a fixed excitation current to flow through the winding to cause a fixed magnetic field for suppressing rotation of the rotor to be generated in a suspension period in which the motor is stopped; performs hold enhancement control that enhances the fixed magnetic field with input of a timing signal defined in advance as a trigger, in the suspension period; and starts rotational excitation control that generates the rotating magnetic field when a rotation start timing arrives.

11 Claims, 11 Drawing Sheets

(51) Int. Cl.
  *G03G 15/00*  (2006.01)
  *H02P 21/18*  (2016.01)
(52) U.S. Cl.
  CPC ... *H02P 21/22* (2016.02); *G03G 2215/00679* (2013.01); *G03G 2215/00945* (2013.01)
(58) Field of Classification Search
  CPC ...... H02P 8/22; H02P 8/24; H02P 8/30; H02P 21/00; H02P 21/0035; H02P 21/0096; H02P 21/146; H02P 21/0092; H02P 23/00; H02P 25/00; H02P 27/00; H02P 27/04; H02P 27/06; H02P 27/08
  USPC ....... 388/800, 819; 318/400.01, 400.02, 700, 318/701, 721
  See application file for complete search history.

(56) References Cited

FOREIGN PATENT DOCUMENTS

| | | |
|---|---|---|
| JP | 2012016122 A | 1/2012 |
| JP | 2017158354 A | 9/2017 |

\* cited by examiner

*FIG. 6*

| D3 | NORMAL HOLD SECTION Ts1 | HOLD ENHANCEMENT SECTION Ts2 | |
|---|---|---|---|
| | FIRST CURRENT VALUE Ih1 | SECOND CURRENT VALUE Ih2 | THIRD CURRENT VALUE Ih3 |
| SETTING A1 | 1 [A] | 4 [A] | 5 [A] |
| SETTING A2 | 1 [A] | 5 [A] | --- |
| SETTING B1 | 0 [A] | 4 [A] | 5 [A] |
| SETTING B2 | 0 [A] | 5 [A] | --- |

MOTOR CONTROLLER, CONVEYOR, IMAGE FORMING APPARATUS, AND MOTOR CONTROL METHOD

The entire disclosure of Japanese patent Application No. 2018-087982, filed on May 1, 2018, is incorporated herein by reference in its entirety.

BACKGROUND

Technological Field

The present invention relates to a motor controller, a conveyor, an image forming apparatus, and a motor control method.

Description of the Related Art

An image forming apparatus such as a printer, a copying machine, or a multifunction machine takes out a sheet (recording sheet) from a storing unit and conveys the sheet, and prints an image on the sheet being conveyed at a predetermined position. In a conveyance path inside the image forming apparatus, rollers are arranged at intervals shorter than the length of the sheet, and the image forming apparatus controls rotational driving of the rollers so that the sheet passes through each position on the conveyance path at a predetermined timing.

In recent years, in drive sources that rotate the rollers, power saving is progressing by replacement from a stepping motor to a brushless motor. A brushless motor of this type generally uses a permanent magnet as a rotor. According to vector control that controls an AC current to be caused to flow through a winding (coil) of the brushless motor as a vector component of a d-q coordinate system, the brushless motor can be rotated smoothly and efficiently.

In a case where a sensorless type brushless motor is used to form a drive system at a low cost, sensorless vector control is performed.

In the sensorless vector control, to determine the AC current, a magnetic pole position of the rotor is estimated on the basis of an induced voltage generated by rotation of the rotor. Since a sufficient level of induced voltage is not generated until the rotation reaches a certain speed or more, when the rotor is rotated from a stopped state, the rotational speed is increased to a predetermined value by so-called forced commutation that generates a rotating magnetic field without estimation of the magnetic pole position. Then, the forced commutation is switched to the sensorless vector control, and the rotation is controlled.

As a prior art relating to the sensorless vector control of the brushless motor, there are techniques described in JP 2011-182505 A and JP 2017-158354 A.

JP 2011-182505 A discloses a technique in which a lock current (fixed excitation current) for drawing the rotor to a predetermined rotation start position is gradually increased prior to the forced commutation, whereby the rotor is reliably stopped at the rotation start position.

JP 2017-158354 A discloses a control sequence in which in a case where a command of restart is given during deceleration for stopping, when the rotational speed is decreased to a predetermined value or less, the rotor is once drawn to a specific position, and then the forced commutation is started.

Note that, regarding control of the stepping motor, there are prior arts described in JP 2012-16122 A and JP 2003-224996 A. JP 2012-16122 A discloses that when a rotor is moved to an initial position, an excitation current to be caused to flow through a coil is gradually increased, whereby noise during the movement is suppressed. JP 2003-224996 A discloses that hold control is performed twice that is initial excitation for determining an initial position of a rotor, and the first hold time is made shorter than the second hold time, whereby a sound during hold is reduced.

When the brushless motor in the stopped state is rotated by the forced commutation, in a case where the magnetic pole position (rotational angular position) of the rotor is unknown, initial position estimation is performed that detects the magnetic pole position, and then the forced commutation is started. Due to performing of the initial position estimation, rotation start is delayed by a required time for the estimation, so that productivity of image formation is decreased when the initial position estimation is performed every time the motor is started. First Print Output Time (FPOT) is also affected that is a time from when a user gives a command of printing until the first sheet is output.

Thus, it is conceivable that the rotor is drawn to an arbitrarily determined position when the motor is stopped or at an appropriate time afterwards, and the rotor is held to be stopped at the position until the next rotation.

However, since a fixed excitation current (hold current) for holding the rotor is continuously caused to flow through the winding, there is a problem that the winding generates heat during stop. In particular, in a case where a large disturbance torque is applied during the stop, it is necessary to hold the rotor with a strong force against the disturbance torque. When a current value is increased to enhance holding force, an amount of heat generation is increased. If the amount of heat generation exceeds a limit temperature in a specification of the winding, degradation and breakage of coating material (resin or the like) of the winding, disappearance of magnetic action (sharp decrease in inductance), and the like occur, and there is a possibility that the motor will not normally operate.

Since the techniques of JP 2011-182505 A and JP 2017-158354 A described above relate to the brushless motor but do not relate to control during a period in which the rotation is stopped, it is not possible to solve the problem of heat generation during the stop described above.

SUMMARY

The present invention has been made in view of the problem described above, and an object of the present invention is to provide a controller and a control method capable of suppressing heat generation of a motor during the stop and preventing unnecessary rotation due to an expected disturbance torque.

To achieve the abovementioned object, according to an aspect of the present invention, a motor controller that controls a motor in which a rotor using a permanent magnet is rotated by a rotating magnetic field due to a current flowing through a winding, reflecting one aspect of the present invention: performs hold control that continuously causes a fixed excitation current to flow through the winding to cause a fixed magnetic field for suppressing rotation of the rotor to be generated in a suspension period in which the motor is stopped; performs hold enhancement control that enhances the fixed magnetic field with input of a timing signal defined in advance as a trigger, in the suspension period; and starts rotational excitation control that generates the rotating magnetic field when a rotation start timing arrives.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating an example of contents of a hold setting table;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
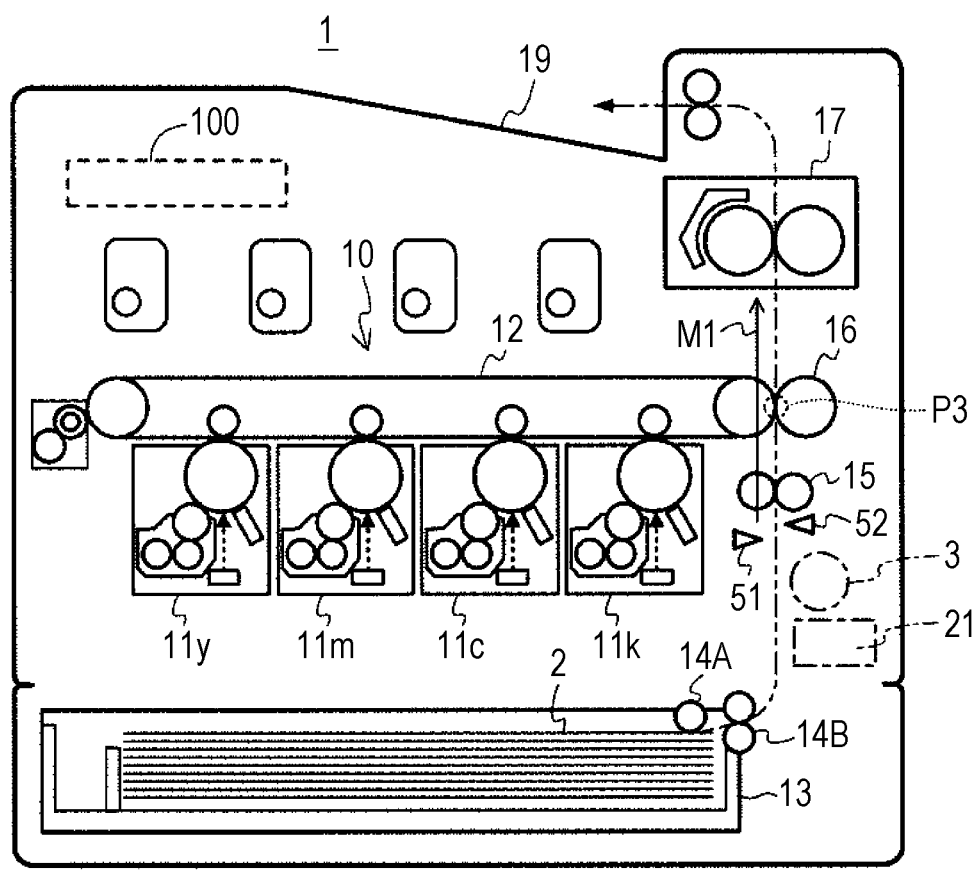
FIG. 1 is a diagram illustrating an outline of a configuration of an image forming apparatus including a motor controller according to an embodiment of the present invention.
Figure 2A:
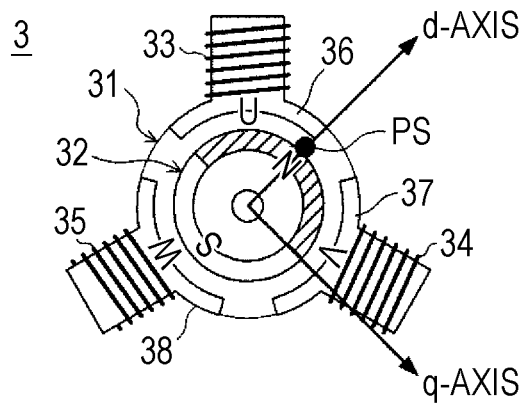
FIGS. 2A and 2B are diagrams each schematically illustrating a configuration of a motor.
Figure 2B:
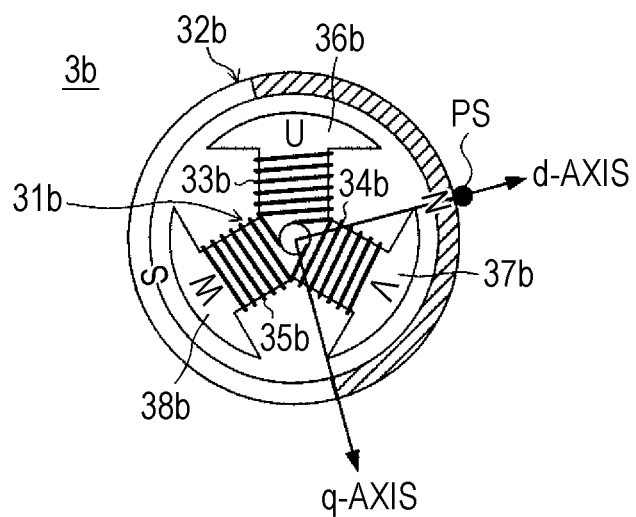

FIG. 1 illustrates an outline of a configuration of an image forming apparatus 1 including a motor controller 21 according to an embodiment of the present invention, and FIGS. 2A and 2B each schematically illustrate a configuration of a motor 3.

In FIG. 1, the image forming apparatus 1 is an electrophotographic color printer including a tandem type printer engine 10. The image forming apparatus 1 forms a color or monochrome image depending on a job input from an external host apparatus via a network. The image forming apparatus 1 includes a control circuit 100 that controls operation of the image forming apparatus 1. The control circuit 100 includes a processor that executes a control program and peripheral devices (ROM, RAM, and the like) of the processor.

The printer engine 10 includes four imaging units 11y, 11m, 11c, and 11k, an intermediate transfer belt 12, and the like.

Basic configurations of the imaging units 11y to 11k are similar to each other, and each includes a cylindrical photoconductor, a charger, a developing device, a cleaner, a light source for exposure, and the like. The intermediate transfer belt 12 is wound around a pair of rollers and is rotated. On the inside of the intermediate transfer belt 12, a primary transfer roller is arranged for each of the imaging units 11y to 11k.

In a color printing mode, the imaging units 11y to 11k form toner images of four colors of yellow (Y), magenta (M), cyan (C), and black (K), respectively in parallel. The four color toner images are primarily transferred sequentially to the intermediate transfer belt 12 being rotated. First, the toner image of Y is transferred, and the toner image of M, the toner image of C, and the toner image of K are sequentially transferred to overlap with the toner image of Y.

In parallel with the formation of the toner image, a sheet (recording sheet) 2 is drawn out from a sheet cassette 13 on the bottom surface side by a pickup roller 14A and fed to a registration roller 15 (timing roller) by a sheet feeding roller 14B.

The registration roller 15 is stopped when the sheet 2 arrives. When the sheet 2 abuts the registration roller 15, the front end part of the sheet 2 bends and the front edge becomes parallel to the roller shaft. Thereafter, the registration roller 15 is rotationally driven at an appropriate timing for aligning the toner image primarily transferred to the intermediate transfer belt 12 and the sheet 2, and feeds the sheet 2 to a printing position P3 on the downstream side. At this time, the sheet 2 is conveyed in a state in which the front edge is parallel to the roller shaft, that is, an inclination (skew) of the sheet 2 with respect to a conveying direction Ml is corrected. The printing position P3 is a position where the intermediate transfer belt 12 faces a secondary transfer roller 16.

The toner image primarily transferred is secondarily transferred to the sheet 2 conveyed by the registration roller 15 at the printing position P3. After the secondary transfer, the sheet 2 is fed to a sheet ejection tray 19 above through the inside of a fixing device 17. When passing through the fixing device 17, the toner image is fixed to the sheet 2 by heating and pressing.

The image forming apparatus 1 includes a plurality of motors as drive sources that rotate rotating bodies such as photoconductors, developing devices, and various rollers. A motor 3 that is one of the drive sources rotationally drives the registration roller 15. The motor 3 is controlled by the motor controller 21. The motor controller 21 rotates or stops the motor 3 in accordance with a command from the control circuit 100.

On the upstream side of the registration roller 15 in a conveyance path of the sheet 2, a sheet sensor 51 is arranged for detecting that the sheet 2 becomes close to the registration roller 15. In addition, in the vicinity of the upstream side of the registration roller 15, a loop sensor 52 is arranged for detecting that the sheet 2 bends and a moderate loop (curved part) is formed.

In FIGS. 2A and 2B, motors 3 and 3b are sensorless type permanent magnet synchronous motors (PMSMs).

The motor 3 illustrated in FIG. 2A includes a stator 31 as an armature that generates a rotating magnetic field, and a rotor 32 of an inner type using a permanent magnet. The stator 31 includes U-phase, V-phase, and W-phase cores 36, 37, and 38 arranged at intervals of an electrical angle of 120°, and three windings (coils) 33, 34, and 35 connected together by Y-connection. Three-phase AC currents of U-phase, V-phase, and W-phase are caused to flow through the windings 33 to 35, and the cores 36, 37, and 38 are excited in order, whereby the rotating magnetic field is generated. The rotor 32 rotates in synchronization with the rotating magnetic field.

Instead of the motor 3, the motor 3*b* illustrated in FIG. 2B can be mounted on the image forming apparatus 1. The motor 3*b* includes a stator 31*b* that generates the rotating magnetic field, and a rotor 32*b* of an outer type using a permanent magnet. The stator 31*b* includes U-phase, V-phase, W-phase cores 36*b*, 37*b*, and 38*b* arranged at intervals of an electrical angle of 120°, and three windings 33*b*, 34*b*, and 35*b* connected together by Y-connection. Similarly to the motor 3, the motor 3*b* also rotates in synchronization with the rotating magnetic field.

In the example illustrated in FIGS. 2A and 2B, the number of magnetic poles of each of the rotors 32 and 32*b* is two. However, the number of magnetic poles of each of the rotors 32 and 32*b* is not limited to two, and may be four or six or more. In addition, the number of slots of each of the stators 31 and 31*b* is not limited to three. In any case, vector control (sensorless vector control) is performed on the motors 3 and 3*b* by the motor controller 21, the vector control performing estimation of a magnetic pole position and a rotational speed by using a control model based on a d-q coordinate system.

Note that, in the following description, a rotational angular position of the N pole indicated by a black circle out of the S pole and the N pole of the rotor 32 may be referred to as a "magnetic pole position PS" of the rotor 32. In addition, a direction from the rotation center of the rotor 32 to the magnetic pole position PS may be referred to as a "magnetic pole direction".

Figure 3:
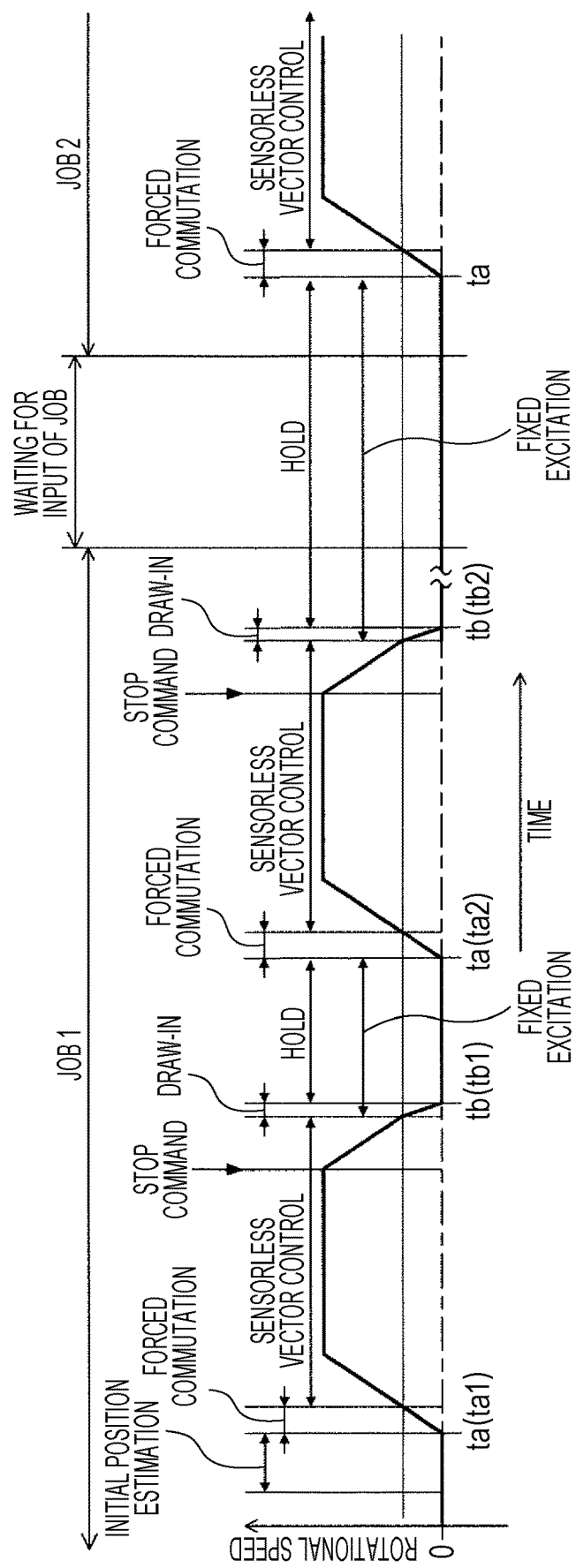
FIG. 3 is a diagram illustrating an example of a drive sequence of the motor.

FIG. 3 illustrates an example of a drive sequence of the motor 3.

As described above, in the image forming apparatus 1, alignment (registration) between the image and the sheet 2, and skew correction of the sheet 2 are performed by using the registration roller 15. For this reason, in a job using a plurality of the sheets 2, control is performed that intermittently rotates the motor 3 to stop the registration roller 15 each time one of the sheets 2 is fed to the printing position P3.

In the example of FIG. 3, a case is assumed in which a job J1 using two sheets 2 is executed, and a job J2 is input after, for example, several minutes or more time has elapsed from the end of the job J1. The magnetic pole position PS of the rotor 32 is unknown at the time of starting the job J1. In addition, it is assumed that a "during-suspension hold mode" is set that holds the rotor 32 by fixed excitation in a suspension period Ts from the stop of rotation to the next rotation.

In the job J1, prior to feeding the first sheet 2 to the printing position P3, initial position estimation is performed that detects the magnetic pole position PS. As a method of the initial position estimation, for example, known inductive sensing can be used.

Forced commutation is started at a rotation start timing ta (ta1) at which the first sheet 2 is to be fed, and when the rotational speed becomes equal to or higher than a predetermined value, the forced commutation is switched to the sensorless vector control. When the sheet 2 passes the printing position P3, the rotational speed is kept constant, and when a stop command is issued immediately after the sheet 2 comes out of the registration roller 15, deceleration for stopping is started. When the rotational speed is decreased to the predetermined value, the sensorless vector control is switched to the fixed excitation to draw the rotor 32 to a predetermined stop position.

In the suspension period Ts in the job from a rotation stop timing tb (tb1) at which the rotor 32 is stopped to a rotation start timing ta (ta2) at which the second sheet 2 is to be fed, the rotor 32 is held by the fixed excitation subsequently from draw-in. When the rotation start timing ta2 arrives, similarly to the first sheet, the forced commutation, the sensorless vector control, and the draw-in by the fixed excitation are performed in order.

At a rotation stop timing tb2 at which the rotor 32 is stopped, the rotational driving in the job J1 is ended; however, also in the subsequent suspension period Ts between jobs, the fixed excitation is performed subsequently from the draw-in at the time of stop in the job J1 to continuously hold the rotor 32. As a result, the initial position estimation in the next job J2 can be omitted, and FPOT of the job J2 can be shortened.

In the job J2, similarly to the Job J1 except that the initial position estimation is omitted, the forced commutation, the sensorless vector control, and the draw-in by the fixed excitation are performed in order, each time one of the sheets 2 is fed to the printing position P3. Then, the rotor 32 is continuously held in the suspension period Ts in which the rotation is stopped.

In the during-suspension hold mode, since the fixed excitation for holding is continuously performed even at the time of a standby waiting for input of a job, there is a possibility that the windings 33 to 35 are overheated. Thus, in the image forming apparatus 1, a motor control function is mounted that suppresses heat generation of the motor 3 in the suspension period Ts to the minimum necessary, and preventing unnecessary rotation due to an expected disturbance torque. Hereinafter, the configuration and operation of the image forming apparatus 1 will be described focusing on the motor control function.

Figure 4:
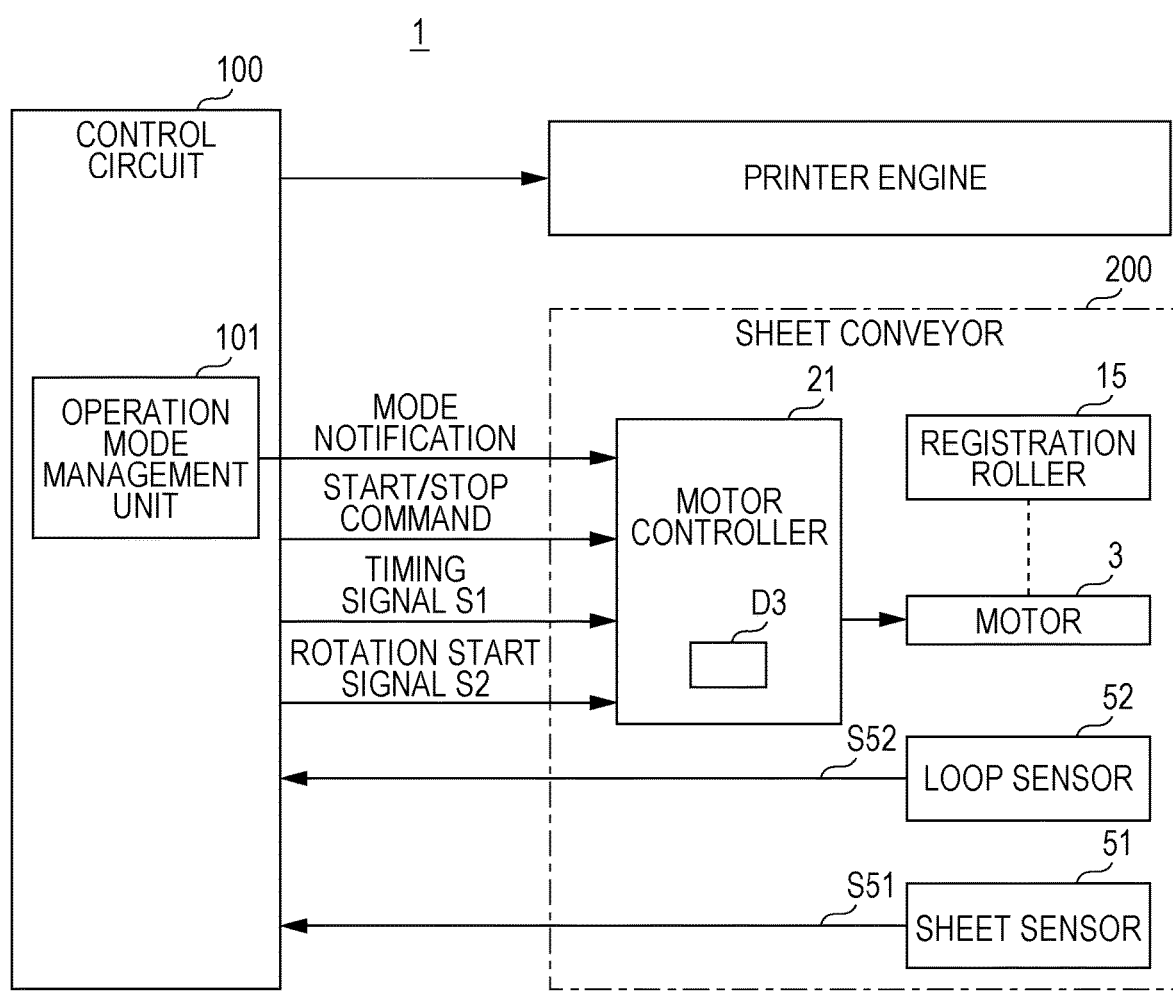
FIG. 4 is a diagram illustrating a configuration of a main part relating to motor control in the image forming apparatus.
Figure 5:
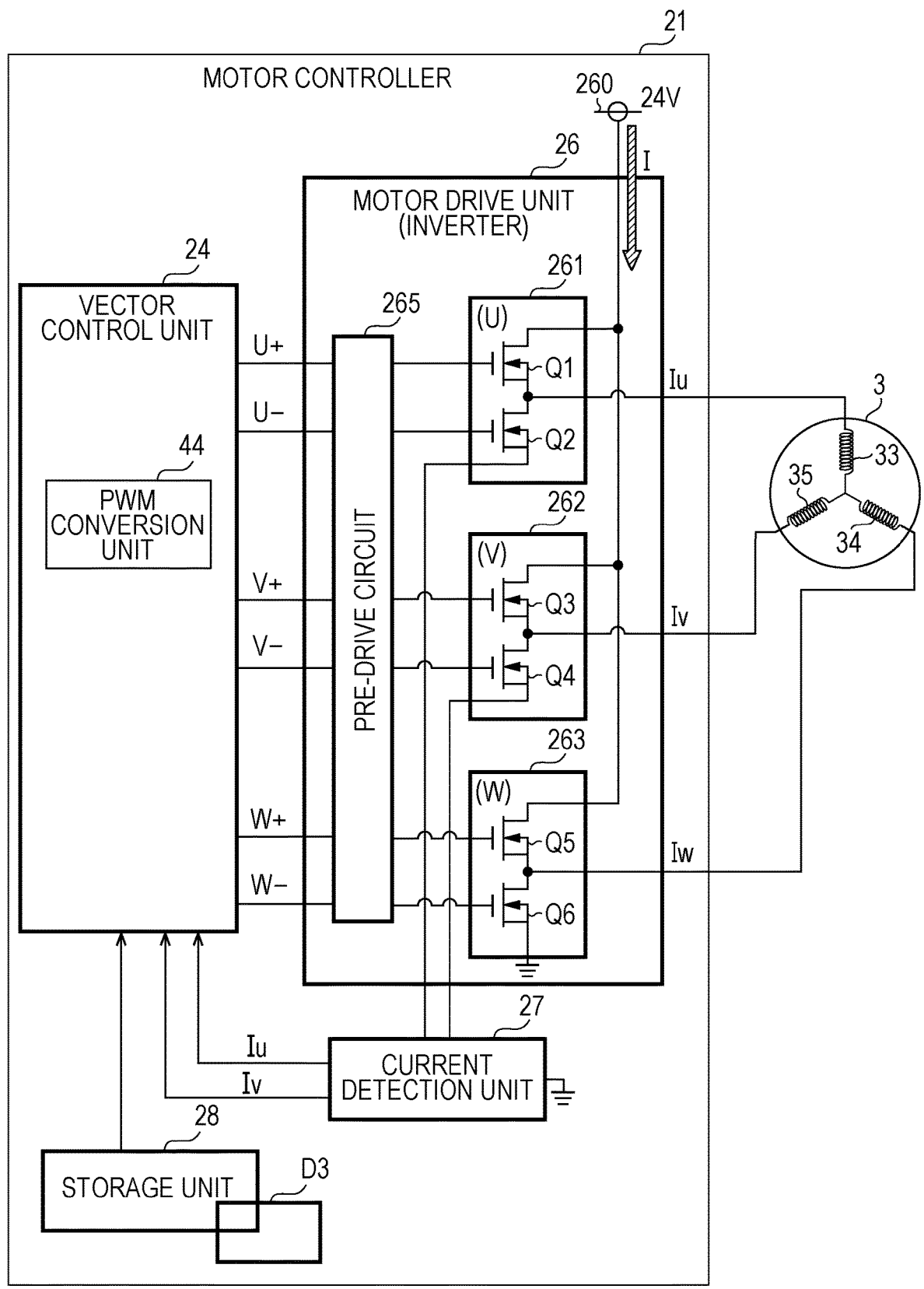
FIG. 5 is a diagram illustrating an outline of a configuration of the motor controller.

FIG. 4 illustrates a configuration of a main part relating to motor control in the image forming apparatus 1, and FIG. 5 illustrates an outline of a configuration of the motor controller 21.

In FIG. 4, the image forming apparatus 1 includes a sheet conveyor 200. The sheet conveyor 200 includes the registration roller 15, the motor 3, the sheet sensor 51, the loop sensor 52, the motor controller 21, and the like.

A detection signal S51 by the sheet sensor 51 and a detection signal S52 by the loop sensor 52 are input to the control circuit 100.

The motor controller 21 stores a hold setting table D3 indicating a plurality of setting contents of a hold current Ih to be described later. To the motor controller 21, a mode notification designating a setting content to be read from the hold setting table D3, a start/stop command, a timing signal S1, a rotation start signal S2, and the like are input from the control circuit 100.

The control circuit 100 includes an operation mode management unit 101. The operation mode management unit 101 manages various operation modes set in the image forming apparatus 1. The operation mode is set depending on designation by a user or a service person, or automatically set depending on states of units of the image forming apparatus 1. In a case where the during-suspension hold mode is set, the operation mode management unit 101 gives information indicating the setting to the motor controller 21 by including the information in the mode notification.

In FIG. 5, the motor controller 21 includes a vector control unit 24, a motor drive unit 26, a current detection unit 27, and a storage unit 28 that stores the hold setting table D3 with a nonvolatile memory.

The motor drive unit 26 is a three-phase inverter for driving the rotor 32 by causing currents to flow through the windings 33 to 35 of the motor 3, and includes three dual elements 261, 262 and 263, and a pre-drive circuit 265.

Each of the dual elements 261 to 263 is a circuit component in which two transistors (for example, field effect transistor (FET)) having uniform characteristics are connected together in series and housed in a package.

A current I flowing through the windings 33 to 35 from a DC power supply line 260 to a ground line is controlled by the dual elements 261 to 263. Specifically, a current Iu flowing through the winding 33 is controlled by transistors Q1 and Q2 of the dual element 261, and a current Iv flowing through the winding 34 is controlled by transistors Q3 and Q4 of the dual element 262. A current Iw flowing through the winding 35 is controlled by transistors Q5 and Q6 of the dual element 263.

The pre-drive circuit 265 converts PWM signals U+, U−, V+, V−, W+, and W− that are control signals subjected to pulse width modulation input from the vector control unit 24, into voltage levels suitable for the transistors Q1 to Q6. The PWM signals U+, U−, V+, V−, W+, and W− after the conversion are input to control terminals (gates) of the transistors Q1 to Q6.

The current detection unit 27 detects the currents Iu and Iv respectively flowing through the windings 33 and 34. Since Iu+Iv+Iw=0, the current Iw can be calculated from values of the detected currents Iu and Iv. Note that, a current of W-phase may be detected.

The current detection unit 27 performs amplification and A/D conversion of voltage drops due to shunt resistors inserted in flow paths of the currents Iu and Iv, and outputs converted signals as detected values of the currents Iu and Iv. That is, two-shunt type detection is performed. A resistance value of the shunt resistor is a small value of the order of $\frac{1}{10}\Omega$. The detected values of the currents Iu and Iv are used in the vector control unit 24 for calculation of an estimated current value in the d-q coordinate system, and the like.

Figure 7:
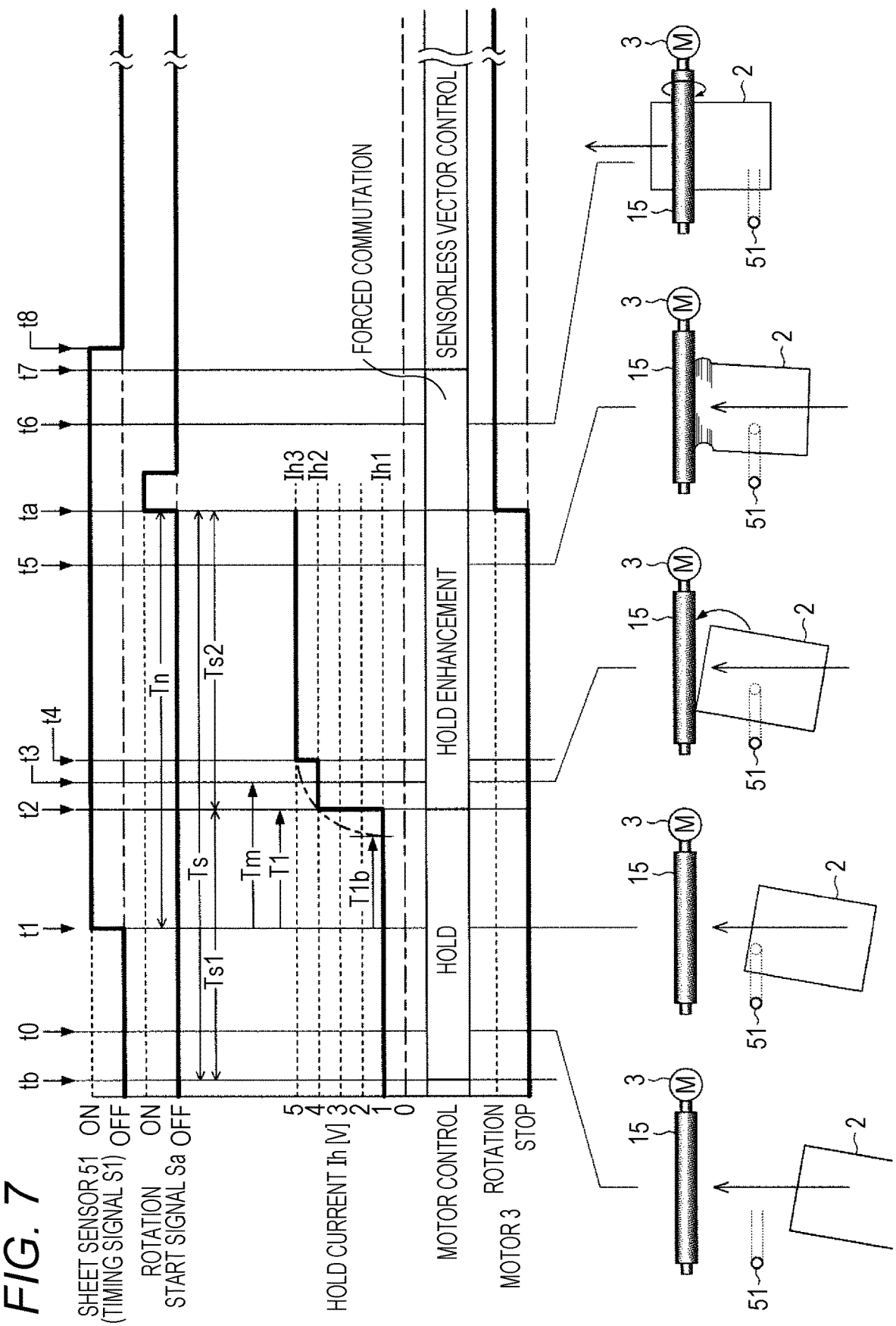
FIG. 7 is a diagram illustrating a first example of switching of current values of a hold current to be caused to flow through the motor.
Figure 8:
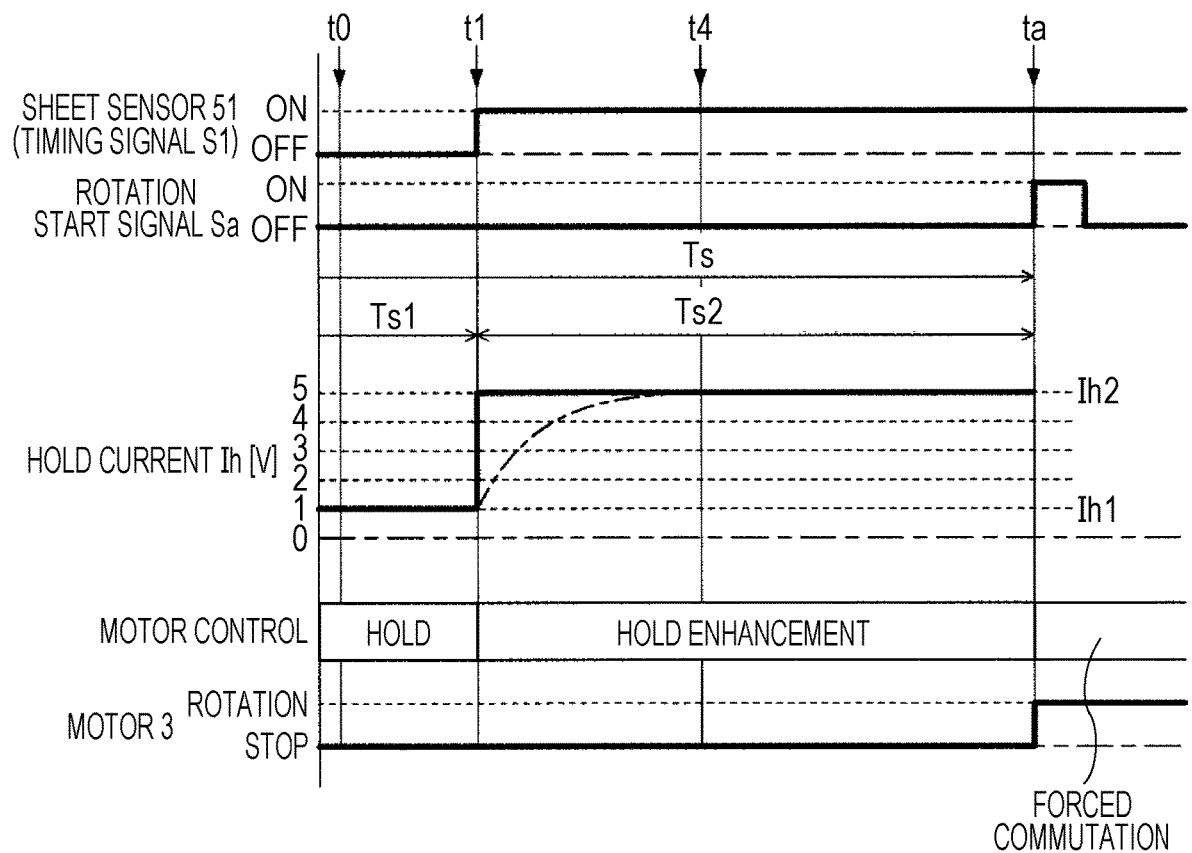
FIG. 8 is a diagram illustrating a second example of switching of the current values of the hold current to be caused to flow through the motor.

FIG. 6 illustrates an example of contents of the hold setting table D3, FIG. 7 illustrates a first example of switching of current values Ih1, Ih2, and Ih3 of the hold current Ih to be caused to flow through the motor 3, and FIG. 8 illustrates a second example of switching of the current values Ih1 and Ih2 of the hold current Ih to be caused to flow through the motor 3.

Note that, in FIG. 7, a conveyance state of the sheet 2 at each of a plurality of timings is schematically illustrated together with a timing chart of the control.

In the example of FIG. 6, four settings (A1, A2, B1, B2) are defined for the current value of the hold current (fixed excitation current) Ih to be caused to flow through the windings 33 to 35 for hold in the suspension period Ts illustrated in FIG. 3.

The setting A1 and the setting A2 are applied in the during-suspension hold mode in which the rotor is positively held by causing the hold current Ih to flow over the entire suspension period Ts. The setting B1 and the setting B2 are applied in an "enhancement section hold mode" in which the rotor is positively held only in a hold enhancement section Ts2 in which it is expected that the disturbance torque is applied in the suspension period Ts. The enhancement section hold mode is selected, for example, in a case where a rotational driving system has a characteristic that the system is not rotated by some external force, the system including the motor 3, an object to be rotated (registration roller), and a transmission mechanism, or in a case where the image forming apparatus 1 is used in an environment in which there is a little possibility that vibration oscillating the image forming apparatus 1 occurs.

In the setting A1, the first current value Ih1 is set to 1 ampere, the second current value Ih2 is set to 4 amperes, and the third current value Ih3 is set to 5 amperes.

The first current value Ih1 is a current value of the current I to be caused to flow from a DC power supply line 260 to the motor 3, as the hold current Ih in a normal hold section Ts1 in which there is a little possibility that the disturbance torque is applied in the suspension period Ts.

The second current value Ih2 and the third current value Ih3 each are a current value of the current I to be caused to flow through the motor 3 in the hold enhancement section Ts2 in which it is expected that the disturbance torque is applied, and are larger than the first current value Ih1. The third current value Ih3 is a current value of the hold current Ih to be caused to flow when it is expected that a particularly large disturbance torque is applied in the hold enhancement section Ts2, and is larger than the second current value Ih2.

In the setting A2, the first current value Ih1 is set to 1 ampere like the setting A1. The second current value Ih2 is set to 5 amperes. In the setting A2, the third current value Ih3 is not defined. This means that the hold current Ih of the second current value Ih2 is caused to flow over the hold enhancement section Ts2.

In the setting B1 and the setting B2, the first current value Ih1 is set to 0 amperes. That is, the hold current Ih is not caused to flow in the normal hold section Ts1.

Regarding the current value in the hold enhancement section Ts2, the setting B1 is the same as the setting A1, and the setting B2 is the same as the setting A2.

In the first example illustrated in FIG. 7, the setting A1 is applied in the rotational driving of the registration roller 15. In FIG. 7, in the suspension period Ts from the rotation stop timing tb to the rotation start timing ta, from the rotation stop timing tb to a timing t2 is set as the normal hold section Ts1, and from the timing t2 to the rotation start timing ta is set as the hold enhancement section Ts2.

In the normal hold section Ts1, hold control is performed in which the hold current Ih of the first current value Ih1 is caused to flow through the windings 33 to 35 to cause a minimum necessary fixed magnetic field to be generated that suppresses unexpected rotation of the rotor 32.

At a timing t0 in the normal hold section Ts1, the sheet 2 is conveyed by the sheet feeding roller 14B and moved toward the registration roller 15. The sheet 2 has not arrived at a detection position of the sheet sensor 51, and the sheet sensor 51 is in the OFF state.

When the sheet 2 arrives at the detection position of the sheet sensor 51 at the timing t1, the sheet sensor 51 is switched from the OFF state to the ON state, and in synchronization with the switching, the timing signal S1 is immediately input from the control circuit 100 to the motor controller 21.

The motor controller 21 starts measuring a time T1 with the input of the timing signal S1 as a trigger. The time T1 is shorter than movement time Tm from the timing t2 to a timing t3 at which the sheet 2 abuts the registration roller 15. The movement time Tm is determined by a distance between the sheet sensor 51 and the registration roller 15, and a conveyance speed, and is, for example, about 0.1 to 0.5 seconds. A difference between the movement time Tm and the time T1 is set to a slight time required for switching processing of the hold current Ih, and the time T1 is substantially equal to the movement time Tm. To suppress the heat generation in the suspension period Ts, it is preferable to set the time T1 as long as possible.

At the timing t2 when the time T1 has elapsed from the timing t1, the motor controller 21 performs hold enhancement control that enhances the fixed magnetic field for holding the rotor 32. Specifically, the current value of the hold current Ih is increased from the first current value Ih1 (1 ampere) to the second current value Ih2 (4 amperes).

At the timing t3, the sheet 2 abuts the registration roller 15, and the impact is transmitted to the motor 3 as the disturbance torque. However, since hold force is enhanced by the hold enhancement control, the rotor 32 is not rotated.

Even after the sheet 2 abuts the registration roller 15, the conveyance is continued, and the sheet 2 bends so that the front edge of the sheet 2 becomes parallel to the roller shaft. Even after the front edge becomes parallel to the roller shaft, the conveyance continues for a while, and the front end part further bends and the loop becomes large.

When the sheet 2 bends, restoring force of the sheet 2 to be flattened is applied to the registration roller 15 as pressing force. There is a possibility that the pressing force becomes the disturbance torque and the rotor 32 is rotated.

Thus, the motor controller 21 further increases the fixed magnetic field by increasing the current value of the hold current Ih from the second current value Ih2 to the third current value Ih3 (5 amperes) at a timing t4 slightly after the timing t3. Thereafter, hold by the third current value Ih3 is continued until the end of the suspension period Ts.

At a timing t5 at which the hold by the third current value Ih3 is performed, the front edge of the sheet 2 is parallel to the roller shaft, and the front end part is bent over the entire length in the width direction.

At the rotation start timing ta after the timing t5, a rotation start signal Sa is input from the control circuit 100 to the motor controller 21. In other words, a timing at which the rotation start signal Sa is input is the rotation start timing ta.

The rotation start timing ta is determined so that the toner image is secondarily transferred to an appropriate position on the sheet 2 in consideration of a conveyance time from the registration roller 15 to the printing position P3. For example, a timing at which a predetermined time Tn has elapsed from the timing t1 can be set as the rotation start timing ta. Alternatively, a timing at which the loop sensor 52 detects that the loop of the sheet 2 has reached a predetermined size may be set as the rotation start timing ta.

When the rotation start signal Sa is input, the motor controller 21 starts the forced commutation that rotates the rotor 32 from a position at which the rotor 32 is held. That is, rotational excitation control is started that generates the rotating magnetic field. At a timing t6 in the figure, the motor 3 is rotated, and the sheet 2 is conveyed by the registration roller 15. A part of the front end side of the sheet 2 comes out of the registration roller 15, but the sheet 2 has not passed the sheet sensor 51.

At a timing t7, the motor controller 21 switches the forced commutation to the sensorless vector control. At a timing t8, the sheet 2 passes the sheet sensor 51, and the timing signal S1 becomes the OFF state.

Note that, depending on a setting of the distance between the sheet sensor 51 and the registration roller 15, the conveyance speed, and a rate of change in speed in the forced commutation, the timing t8 may precede the timing t7, and may also precede the timing t6.

As a modification of the first example of FIG. 7, instead of the processing of increasing the hold current Ih stepwise at the timing t2 and the timing t4, processing may be performed of increasing the hold current Ih continuously as indicated by a broken line in the figure, as the hold enhancement control.

For example, if the hold current Ih is increased by using a time constant circuit, it is sufficient to perform the processing of switching the current value only once, and a burden of the control becomes smaller as compared with the case where the stepwise switching is performed. In the illustrated example, increase in the hold current Ih is started when a time T1b has elapsed from the timing t1 so that the current value becomes equal to or larger than the second current value Ih2 at the timing t3 The time T1b is shorter than the time T1.

In the second example illustrated in FIG. 8, the setting A2 is applied in the rotational driving of the registration roller 15. In FIG. 8, in the suspension period Ts from the rotation stop timing tb to the rotation start timing ta, from the rotation stop timing tb to the timing t1 is set as the normal hold section Ts1, and from the timing t1 to the rotation start timing ta is set as the hold enhancement section Ts2.

In the normal hold section Ts1, similarly to the first example of FIG. 7, the hold control is performed in which the hold current Ih of the first current value Ih1 is caused to flow through the windings 33 to 35.

At the timing t1, the sheet 2 arrives at the detection position of the sheet sensor 51, and the timing signal S1 is input from the control circuit 100 to the motor controller 21.

When the timing signal S1 is input, the motor controller 21 immediately performs the hold enhancement control that enhances the fixed magnetic field for holding the rotor 32. That is, the current value of the hold current Ih is increased from the first current value Ih1 to the second current value Ih2. Since the second current value Ih2 in the setting A2 is 5 amperes, the current value is increased from 1 ampere to 5 amperes.

Thereafter, the motor controller 21 continuously holds the rotor by the second current value Ih2 until the end of the suspension period Ts.

In the hold enhancement control that increases the current value of the hold current Ih from the first current value Ih1 to the second current value Ih2 in this way, the current value may be continuously increased as indicated by a broken line in the figure.

Next, a circuit configuration for switching the current value of the hold current Ih will be described.

Figure 9:
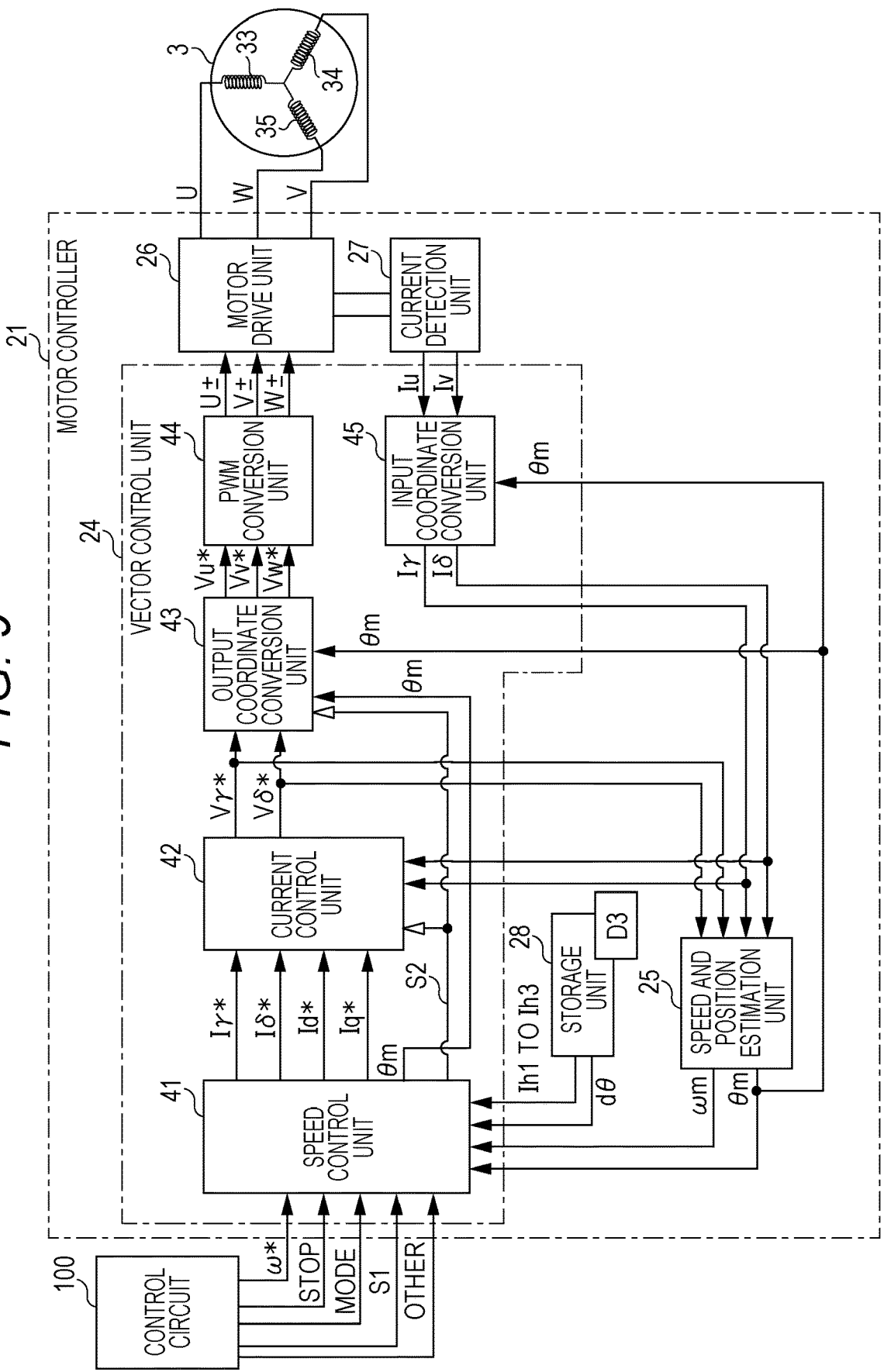
FIG. 9 is a diagram illustrating a configuration of a vector control unit in the motor controller.
Figure 10:
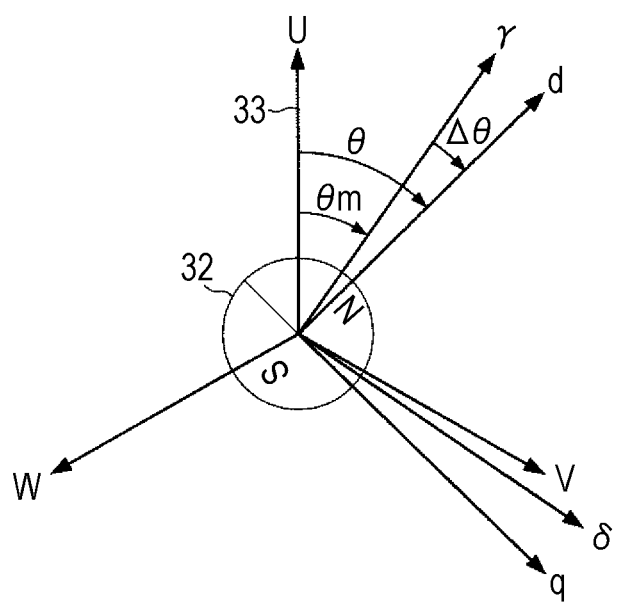
FIG. 10 is a diagram illustrating a d-q axis model of the motor.

FIG. 9 illustrates a configuration of the vector control unit 24 in the motor controller 21, and FIG. 10 illustrates a d-q axis model of the motor 3. In the vector control of the motor 3, the control is simplified by converting the AC currents of three phases flowing through the windings 33 to 35 into DC currents to be caused to flow through the windings of two phases rotating in synchronization with the permanent magnet that is the rotor 32.

As illustrated in FIG. 10, a magnetic flux direction (direction of the N pole) of the permanent magnet is a d-axis, and a direction advanced by an electrical angle of $\pi/2$ [rad] (90°) from the d-axis is a q-axis. The d-axis and q-axis are model axes. With the U-phase winding 33 as a reference, an advance angle of the d-axis with respect to the reference is defined as $\theta$. The angle $\theta$ indicates an angular position (magnetic pole position PS) of the magnetic pole with respect to the U-phase winding 33. The d-q coordinate system is at a position advanced by the angle $\theta$ from the U-phase winding 33 as the reference.

Since the motor 3 does not include a position sensor that detects the angular position of the rotor 32, it is necessary to estimate the magnetic pole position PS of the rotor 32 in the motor controller 21. A γ-axis is defined corresponding to an estimated angle θm indicating an estimated magnetic pole position, and a position advanced by an electrical angle of π/2 from the y-axis is defined as a δ-axis. A γ-δ coordinate system is at a position advanced by the estimated angle θm from the U-phase winding 33 as the reference. A delay of the estimated angle θm with respect to the angle θ is defined as Δθ.

In FIG. 9, the vector control unit 24 controls the motor drive unit 26 depending on a speed command value ω* included in the command from the control circuit 100. When the stop command is input, the motor drive unit 26 is controlled so that the rotor 32 is stopped, and in the case of the during-suspension hold mode, the motor drive unit 26 is controlled so that the rotor 32 is held until the next rotation start timing ta.

As control that stops the rotor 32, the vector control unit 24 determines a current that generates the fixed magnetic field for drawing the magnetic pole position PS to the stop position and stopping the rotor 32 on the basis of the estimated magnetic pole position PS. Then, the PWM signals U+, U−, V+, V−, W+, and W− that cause the determined current to flow through the windings 33 to 35 are given to the motor drive unit 26.

In addition, as control that holds the rotor 32, the vector control unit 24 controls the motor drive unit 26 so that the hold current Ih of the first current value Ih1 that generates the fixed magnetic field flows subsequently to the time of the draw-in. Then, the PWM signals U+, U−, V+, V−, W+, and W− are changed so that the hold current Ih of the second current value Ih2 or the third current value Ih2 flows in the hold enhancement section Ts2. Details are as follows.

The vector control unit 24 includes a speed control unit 41, a current control unit 42, an output coordinate conversion unit 43, a PWM conversion unit 44, and an input coordinate conversion unit 45. Commands, notifications, timing signals, and the like from the control circuit 100 are input to the speed control unit 41.

In addition to the vector control unit 24, the motor controller 21 includes a speed and position estimation unit 25, and the storage unit 28. The storage unit 28 stores the hold setting table D3, an angle dθ related to the draw-in of the rotor 32, control data for the forced commutation, and the like.

In the sensorless vector control, the following processing is performed.

On the basis of the speed command value ω* from the control circuit 100 and an estimated speed value tom from the speed and position estimation unit 25, the speed control unit 41 determines current command values Iγ* and Iδ* of the γ-δ coordinate system so that the estimated speed value min becomes close to the speed command value ω*.

The current control unit 42 determines voltage command values Vγ* and Vδ* of the γ-δ coordinate system on the basis of the current command values Iγ* and Iδ*.

On the basis of the estimated angle θm from the speed and position estimation unit 25, the output coordinate conversion unit 43 converts the voltage command values Vγ* and Vδ* into U-phase, V-phase, and W-phase voltage command values Vu*, Vv*, and Vw*.

The PWM conversion unit 44 generates the control signals U+, U−, V+, V−, W+, and W− on the basis of the voltage command values Vu*, Vv*, Vw* and outputs the control signals to the motor drive unit 26. The control signals U+, U−, V+, V−, W+, and W− are signals for controlling the frequency and amplitude of three-phase AC power to be supplied to the motor 3 by pulse width modulation (PWM).

The input coordinate conversion unit 45 calculates a value of the W-phase current Iw from values of the U-phase current Iu and the V-phase current Iv detected by the current detection unit 27. Then, on the basis of the estimated angle θm from the speed and position estimation unit 25 and the values of the three-phase currents Iu, Iv, and Iw, estimated current values Iγ and Iδ of the γ-δ coordinate system are calculated. That is, conversion is performed of the current from three phases to two phases.

On the basis of the estimated current values Iγ and Iδ from the input coordinate conversion unit 45 and the voltage command values Vγ* and Vδ* from the current control unit 42, the speed and position estimation unit 25 obtains the estimated speed value ωm and the estimated angle θm in accordance with a so-called voltage current equation.

The obtained estimated speed value ωm is input to the speed control unit 41, and the obtained estimated angle θm is input to the speed control unit 41, the output coordinate conversion unit 43, and the input coordinate conversion unit 45.

The motor drive unit 26 is controlled by the units of the vector control unit 24 and the speed and position estimation unit 25, so that the motor 3 is rotationally driven.

When the stop command is input, the motor controller 21 starts deceleration control. The deceleration control is not limited to the sensorless vector control but may be a so-called three-phase short circuit type short brake control or free-run control.

When a rotational speed ω is decreased to the vicinity of a lower limit value at which the magnetic pole position PS can be estimated, the motor controller 21 performs draw-in control that draws the magnetic pole of the rotor 32 to the predetermined stop position and stops the rotor, instead of the deceleration control. The draw-in control is fixed excitation control that generates the fixed magnetic field.

For the draw-in control, the estimated angle θm by the speed and position estimation unit 25 is used. Since the d-axis indicating the magnetic flux direction of the permanent magnet is almost the same as the γ-axis determined by the estimated angle θm, the d-axis and the q-axis are respectively treated as being equal to the γ-axis and the δ-axis.

In addition, although the d-axis and the q-axis each ideally indicate the magnetic flux direction of the permanent magnet, the γ-axis and the δ-axis are actually estimated or detected via the estimated angle θm, so that the γ-axis and the δ-axis may be used in actual control. That is, in the present invention, instead of the d-axis and the q-axis, the γ-axis and the δ-axis can be used, and also, Iγ, Iδ, and θm can be used instead of Id, Iq, and θ.

In the draw-in control, the motor controller 21 defines a magnetic field vector from the rotation center of the rotor 32 toward the stop position. The magnetic field vector represents a magnetic field that draws the rotor to the stop position.

The stop position that defines a direction of the magnetic field vector is set to a position within a range in which an amount of deviation in each of an advance direction and a delay direction with respect to the magnetic pole position PS is an electrical angle of 180 degrees at most.

In the present example, it is assumed that the stop position is a relative position determined with the magnetic pole position PS at that time as a reference. However, the stop position may be a fixed position (absolute position) defined in advance. The angle dθ from the magnetic pole position PS to the stop position when the stop position is set as a relative position is defined in advance and stored in the storage unit 28.

Defining the magnetic field vector corresponds to defining a current vector in the same direction as the magnetic field vector. The current vector represents a current to be caused to flow through the windings 33 to 35 that generates the magnetic field for drawing the rotor 32 to the stop position.

Defining the current vector is to set a direction and magnitude of the current vector on actual processing for controlling the motor drive unit 26. As the direction of the current vector, the angle θm indicating the angular position of the d-axis is set. Then, as the magnitude of the current vector, the d-axis component Id and the q-axis component Iq of the current vector are set.

When the magnitude of the current vector is I, the d-axis component Id and the q-axis component Iq are expressed by the following equations.

$$Id = I \times \cos(d\theta)$$

$$Iq = I \times \sin(d\theta)$$

When switching the deceleration control to the draw-in control, the speed control unit 41 outputs a fixed excitation mode signal S2 indicating a period in which fixed excitation is to be performed. The fixed excitation mode signal S2 is continuously input to the current control unit 42 and the output coordinate conversion unit 42 until the rotation start timing to at which forced commutation is started.

In the draw-in control, the speed control unit 41 acquires the latest estimated angle θm indicating the magnetic pole position PS from the speed and position estimation unit 25, and gives the acquired estimated angle θm to the output coordinate conversion unit 43. The output coordinate conversion unit 43 stores current command values Id* and Iq* given, until the values are newly given.

The speed control unit 41 determines the magnitude (I) of the current vector for the draw-in. In the present example, the magnitude is determined to correspond to the first current value Ih1. In addition, the angle dθ is acquired from the storage unit 28, and the d-axis component Id and the q-axis component Iq of the current vector are calculated. Then, the d-axis component Id as the current command value Id* and the q-axis component Iq as the current command value Iq* are given to the current control unit 42. The current control unit 42 stores the current command values Id* and Iq* given, until the values are newly given.

When the fixed excitation mode signal S2 from the speed control unit 41 is in the ON state, the current control unit 42 determines the voltage command values Vγ* and Vδ* on the basis of the current command values Id* and Iq* instead of the current command values Iγ* and Iδ*. Since the current command values Id* and Iq* input during the draw-in control are kept constant, the voltage command values Vγ* and Vδ* determined at the beginning are continuously output.

When the fixed excitation mode signal S2 is in the ON state, the output coordinate conversion unit 43 converts the voltage command value Vγ* and Vδ* into the voltage command values Vu*, Vv*, and Vw* on the basis of the estimated angle θm from the speed control unit 41 instead of the estimated angle θm from the speed and position estimation unit 25. Since the voltage command values Vγ* and Vδ* input during the draw-in control are kept constant, the voltage command values Vu*, Vv*, and Vw* determined at the beginning are continuously output.

At the timing t2 and t4 (see FIG. 7) in the hold enhancement section Ts2, the speed control unit 41 acquires the second current value Ih2 or the third current value Ih3 from the storage unit 28. The magnitude (I) of the current vector is changed to correspond to the acquired current value, and the d-axis component Id and the q-axis component Iq of the current vector after the change are calculated. At this time, the angle dθ is set to the same value as that at the time of the draw-in. Then, the calculated d-axis component Id as the current command value Id* and the calculated q-axis component Iq as the current command value Iq* are given to the current control unit 42.

As a result, the current control unit 42, the output coordinate conversion unit 43, and the PWM conversion unit 44 respectively output signals corresponding to the current vectors after the change, so that the control signals U+, U−, V+, V−, W+, and W− are changed, and the current value of the hold current Ih flowing through the motor 3 is changed.

Figure 11:
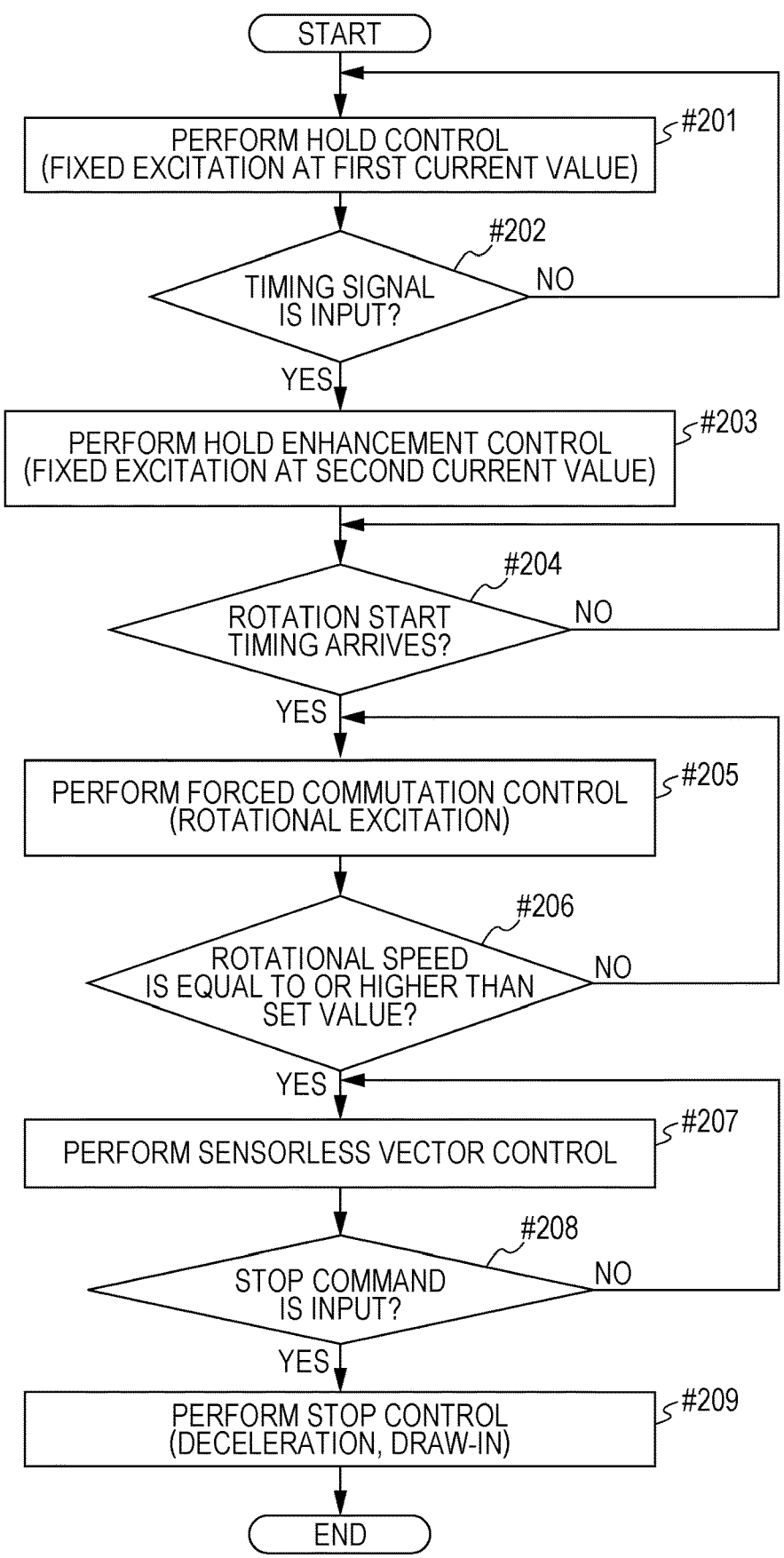
FIG. 11 is a diagram illustrating a flow of processing in the motor controller.

FIG. 11 illustrates a flow of processing in the motor controller 21.

The motor controller 21 performs the hold control until the timing signal S1 is input when the rotor 23 of the motor 3 is stopped (NO in #201, #202). In the hold control, the hold current Ih of the first current value Ih1 is caused to flow through the windings 33 to 35.

When the timing signal S1 is input (YES in #202), the hold enhancement control is performed (#203) at the timing triggered by the timing signal S1, that is, immediately or after a predetermined time has elapsed. In the hold enhancement control, the hold current Ih of the second current value Ih2 larger than the first current value Ih1 is caused to flow through the windings 33 to 35.

The hold enhancement control is continued and arrival of the rotation start timing ta is waited (#204), and when the rotation start timing ta arrives (YES in #204), the forced commutation control is started (#205).

When the rotational speed of the motor 3 is increased to equal to or higher than the predetermined value (YES in #206), the forced commutation control is switched to the sensorless vector control, and the motor 3 is controlled (#207).

When the stop command is input (YES in #208), the sensorless vector control shifts to the stop control (#209). As the stop control, the deceleration control and the draw-in control are performed in order.

According to the above embodiment, the suspension period Ts is divided into the normal hold section Ts1 in which a small hold current is caused to flow, and the hold enhancement section Ts2 in which a large hold current is caused to flow, so that heat generation of the motor 3 during stop is suppressed, and unnecessary rotation due to the expected disturbance torque can be prevented.

In addition, the initial position estimation can be omitted when a print job input in the suspension period Ts is executed, so that the required time (FPOT) until the first printed matter is output can be shortened.

In the embodiment described above, the object to be rotated by the motor 3 is the registration roller 15, and the ON state of the sheet sensor 51 is set as the reference of the timing signal S1; however, the object to be rotated and a mode of generation of the timing signal S1 are not limited thereto. The object to be rotated may be other rotating bodies such as a photoconductor, a developing roller, and a screw of a toner replenishing unit. The control circuit 100 may output the timing signal S1 when a value of a control counter reaches a predetermined value, or at a predetermined time.

For example, in a case where it is decided to move a movable body different from the object to be driven by the motor 3 during a standby waiting for input of a job, and vibration affecting the motor 3 accompanies the movement, the control circuit 100 outputs the timing signal S1 immediately before moving the movable body.

In the embodiment described above, the final stage of the suspension period Ts is set as the hold enhancement section Ts2, but other than the final stage can be set as the hold enhancement section Ts2. In addition, as necessary, a plurality of the hold enhancement sections Ts2 may be provided in the suspension period Ts. However, to suppress the heat generation of the motor 3, it is preferable that a ratio occupied by the hold enhancement section Ts2 is small in the suspension period Ts.

Instead of inputting the timing signal S1 from the control circuit 100 to the motor controller 21, the detection signal S51 of the sheet sensor 51 itself may be input as the timing signal S1 to the motor controller 21 from the sheet sensor 51.

Switching of the current value of the hold current Ih may be stepwise switching of three or more stages. In addition, the hold enhancement control may be control that increases strength of the fixed magnetic field by switching an output voltage of the DC power supply line 260.

The motor controller 21 can be provided in any device including the motor 3 to be controlled, and is not limited to a device incorporated in the image forming apparatus 1.

In addition, the configuration of the whole or a part of the image forming apparatus 1 and the motor controller 21, contents, sequence, or timing of the processing, the current values Ih1 to Ih3 of the hold current Ih, a threshold value thDL, a set value thDd, and the like can be appropriately changed in accordance with the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A motor controller that controls a motor in which a rotor using a permanent magnet is rotated by a rotating magnetic field due to a current flowing through a winding, the motor controller:
    performing hold control that continuously causes a fixed excitation current to flow through the winding to cause a fixed magnetic field for suppressing rotation of the rotor to be generated in a suspension period in which the motor is stopped;
    performing hold enhancement control that enhances the fixed magnetic field with input of a timing signal defined in advance as a trigger, in the suspension period; and
    starting rotational excitation control that generates the rotating magnetic field when a rotation start timing arrives.

2. The motor controller according to claim 1, wherein the hold enhancement control is control that increases a current value of the fixed excitation current stepwise or continuously.

3. The motor controller according to claim 1, wherein a direction and magnitude of magnetic flux of the fixed magnetic field are determined by using a control model based on a d-q coordinate system in which a d-axis is a direction from a rotation center of the rotor toward a magnetic pole position, in the hold control and the hold enhancement control.

4. The motor controller according to claim 1, wherein the motor to be controlled is a conveyance motor that drives a conveyance member, the conveyance member coming in contact with an object having moved in to further move the object; and
    a signal is input as the timing signal, the signal being synchronized with a detection signal by a sensor that detects arrival of the object at a position on an upstream side of the conveyance member in a moving direction of the object.

5. The motor controller according to claim 4, wherein the hold enhancement control is performed when a set time has elapsed, the set time being shorter than a movement time from inputting of the timing signal until the object comes in contact with the conveyance member.

6. A conveyor comprising:
    the conveyance motor;
    the sensor; and
    the motor controller according to claim 4.

7. An image forming apparatus comprising:
    the conveyor according to claim 6; and
    a printer engine that prints an image on the object at a position on a downstream side of the conveyance member in the moving direction.

8. The image forming apparatus according to claim 7, wherein
    the object is a sheet, and
    the conveyance member is a registration roller that bends a front end part of the sheet and corrects an inclination with respect to the moving direction.

9. The image forming apparatus according to claim 8, wherein,
    the motor controller switches the current value of the fixed excitation current from a first current value to a second current value larger than the first current value when the timing signal is input, and further switches the current value of the fixed excitation current from the second current value to a third current value larger than the second current value at a timing when the sheet comes in contact with the registration roller and bending occurs, as the hold enhancement control.

10. The image forming apparatus according to claim 9, wherein
    the rotation start timing is a timing after correction of the inclination of the sheet is completed.

11. A motor control method that intermittently rotates a motor in which a rotor using a permanent magnet is rotated by a rotating magnetic field due to a current flowing through a winding, the motor control method comprising:
    performing sensorless vector control, as control that rotates the rotor at a target speed;
    performing fixed excitation control that continuously causes a current to flow through the winding, the current generating a fixed magnetic field for drawing a magnetic pole position of the rotor to a stop position, as control that stops and holds the rotor until a next rotation start timing; and
    starting forced commutation control that rotates the rotor from a state in which the rotor is held at the stop position at the rotation start timing, and then shifting to the sensorless vector control, wherein
    the fixed excitation control makes a current value of the current in a hold enhancement section larger than a current value in another section, the hold enhancement section being a section in which occurrence of external force that rotates the rotor is expected in a period from a timing when the rotor is stopped to the rotation start timing.

* * * * *